(12) United States Patent
Taylor

(10) Patent No.: US 12,732,594 B2
(45) Date of Patent: Sep. 8, 2026

(54) BANDWIDTH ALLOCATION

(71) Applicant: Airbus Defence and Space Limited, Stevenage (GB)

(72) Inventor: Stuart Taylor, Stevenage (GB)

(73) Assignee: Airbus Defence and Space Limited, Stevenage (GB)

( * ) Notice: Subject to any disclaimer, the term of this patent is extended or adjusted under 35 U.S.C. 154(b) by 207 days.

(21) Appl. No.: 17/921,679

(22) PCT Filed: Apr. 29, 2021

(86) PCT No.: PCT/GB2021/051028
§ 371 (c)(1),
(2) Date: Oct. 27, 2022

(87) PCT Pub. No.: WO2021/220000
PCT Pub. Date: Nov. 4, 2021

(65) Prior Publication Data

US 2024/0267489 A1 Aug. 8, 2024

(30) Foreign Application Priority Data

Apr. 30, 2020 (GB) ...................................... 2006353

(51) Int. Cl.
*H04N 7/18* (2006.01)
*H04L 41/0896* (2022.01)
(Continued)

(52) U.S. Cl.
CPC ......... *H04N 7/181* (2013.01); *H04L 41/0896* (2013.01); *G06V 20/17* (2022.01); *G06V 20/52* (2022.01)

(58) Field of Classification Search
None
See application file for complete search history.

(56) References Cited

U.S. PATENT DOCUMENTS 9,565,403 B1 * 2/2017 Higgins ................. G06V 20/17
10,073,449 B1 * 9/2018 Sait ......................... H04L 67/02
(Continued)

FOREIGN PATENT DOCUMENTS

EP 2533152 A1 12/2012
JP 2010108062 A 5/2010

OTHER PUBLICATIONS

International Search Report dated Jun. 24, 2021; priority document.
(Continued)

*Primary Examiner* — Daniel T Tekle
(74) *Attorney, Agent, or Firm* — Greer, Burns & Crain, Ltd.

(57) ABSTRACT

A method of allocating bandwidth in a system including first and second data collectors in communication with a supervising node over a shared communications resource, the method including: transmitting sensor data from the first and second data collectors to the supervising node over the shared communications resource; performing computer object detection on sensor data collected by the first and second data collectors; responsive to the computer object detection identifying an object of interest within the sensor data collected by the first data collector, increasing the bandwidth allocated to the first data collector on the shared communications resource; and transmitting further sensor data from the first data collector to the supervising node utilizing the increased bandwidth allocation.

19 Claims, 8 Drawing Sheets

(51) Int. Cl.
*G06V 20/17* (2022.01)
*G06V 20/52* (2022.01)

(56) References Cited

U.S. PATENT DOCUMENTS

| | | | | |
|---|---|---|---|---|
| 2003/0193395 | A1* | 10/2003 | Ahiska | G08B 25/08 375/240 |
| 2012/0133774 | A1* | 5/2012 | Sarhan | G08B 13/19645 348/E7.085 |
| 2012/0162421 | A1* | 6/2012 | Iwamura | G08B 25/06 348/143 |
| 2016/0381596 | A1* | 12/2016 | Hu | H04W 28/0268 370/236 |
| 2019/0041225 | A1* | 2/2019 | Winkle | H04W 48/16 |
| 2019/0199970 | A1* | 6/2019 | Greiner | G06V 40/10 |
| 2019/0313516 | A1* | 10/2019 | Cartmill | F21V 23/00 |
| 2020/0322217 | A1* | 10/2020 | Stark | H04L 41/0816 |
| 2023/0018929 | A1* | 1/2023 | Yakupov | G06V 40/172 |

OTHER PUBLICATIONS

Great Britain Search Report dated Oct. 16, 2020; priority document.

* cited by examiner

BANDWIDTH ALLOCATION

CROSS-REFERENCES TO RELATED APPLICATIONS

This application claims the benefit of the International Application No. PCT/GB2021/051028, filed on Apr. 29, 2021, and of the Great Britain patent application No. 2006353.3 filed on Apr. 30, 2020, the entire disclosures of which are incorporated herein by way of reference.

FIELD OF THE INVENTION

The present disclosure concerns bandwidth allocation. More particularly, but not exclusively, this disclosure concerns measures, including methods, apparatus and computer programs, for use in allocating bandwidth in a system comprising first and second data collectors in communication with a supervising node over a shared communications resource.

BACKGROUND OF THE INVENTION

Intelligence, surveillance and reconnaissance (ISR) is the coordinated and integrated acquisition, processing and provision of timely, accurate, relevant, coherent and assured information and intelligence to support a commander's conduct of activities.

Commonly, data links between multiple ISR data collectors and a joint ISR supervising node utilize shared bandwidth provided by a shared communications resource. An example of a shared communications resource is a communications satellite using shared spectrum on a single transponder. Known systems split the shared bandwidth resources equally between the multiple ISR data collectors. Some systems allow an operator to manually assign a greater portion of the shared bandwidth to a particular ISR data collector when desired. For example, when pertinent intelligence is spotted by an operator within the field of view of a particular ISR data collector, an operator may manually assign a greater portion of the shared bandwidth to that particular ISR data collector. This allows a higher quality video stream to be temporarily provided from that particular ISR data collector to the ISR supervising node at critical times in an operation. However, the reconfiguring of bandwidth allocation in known ISR systems is a manual operation performed by an operator and therefore relies on an operator spotting pertinent intelligence in the first place. This may result in otherwise valuable intelligence being overlooked as a result of operator error or operator unavailability.

The present disclosure seeks to ameliorate the allocation of bandwidth, with applications in, but not limited to, improved ISR systems.

SUMMARY OF THE INVENTION

According to a first aspect, there is provided a method of allocating bandwidth in a system comprising first and second data collectors in communication with a supervising node over a shared communications resource, the method comprising: transmitting sensor data from the first and second data collectors to the supervising node over the shared communications resource; performing computer object detection on sensor data collected by the first and second data collectors; responsive to the computer object detection identifying an object of interest within the sensor data collected by the first data collector, increasing the bandwidth allocated to the first data collector on the shared communications resource; and transmitting further sensor data from the first data collector to the supervising node utilizing the increased bandwidth allocation.

According to a second aspect, there is provided apparatus comprising first and second data collectors in communication with a supervising node over a shared communications resource, the apparatus being configured to: transmit sensor data from the first and second data collectors to the supervising node over the shared communications resource; perform computer object detection on sensor data collected by the first and second data collectors; responsive to the computer object detection identifying an object of interest within the sensor data collected by the first data collector, increase the bandwidth allocated to the first data collector on the shared communications resource; and transmit further sensor data from the first data collector to the supervising node utilizing the increased bandwidth allocation.

According to a third aspect, there is provided a computer program comprising a set of instructions, which, when executed by computerized apparatus, cause the computerized apparatus to perform a method of allocating bandwidth, the method comprising: transmitting sensor data from the first and second data collectors to the supervising node over a shared communications resource; performing computer object detection on sensor data collected by first and second data collectors; responsive to the computer object detection identifying an object of interest within the sensor data collected by the first data collector, increasing the bandwidth allocated to the first data collector on the shared communications resource; and transmitting further sensor data from the first data collector to a supervising node utilizing the increased bandwidth allocation.

According to a fourth aspect, there is provided a system comprising first and second data collectors in communication with a supervising node over a shared communications resource, the system being configured to: at the first data collector, transmit sensor data from the first data collector to the supervising node over the shared communications resource; at the second data collector, transmit sensor data from the second data collector to the supervising node over the shared communications resource; at the first data collector, perform computer object detection on sensor data collected by the first data collector; at the supervising node, responsive to the computer object detection identifying an object of interest within the sensor data collected by the first data collector, increase the bandwidth allocated to the first data collector on the shared communications resource; and at the first data collector, transmit further sensor data from the first data collector to the supervising node utilizing the increased bandwidth allocation.

It should be appreciated that features described in relation to one aspect of the present disclosure may be incorporated into other aspects of the present disclosure. For example, a method aspect may incorporate any of the features described with reference to an apparatus aspect and vice versa.

BRIEF DESCRIPTION OF THE DRAWINGS

Embodiments of the present disclosure will now be described by way of example only with reference to the accompanying schematic drawings of which.

DETAILED DESCRIPTION OF THE PREFERRED EMBODIMENTS

Figure 1A:
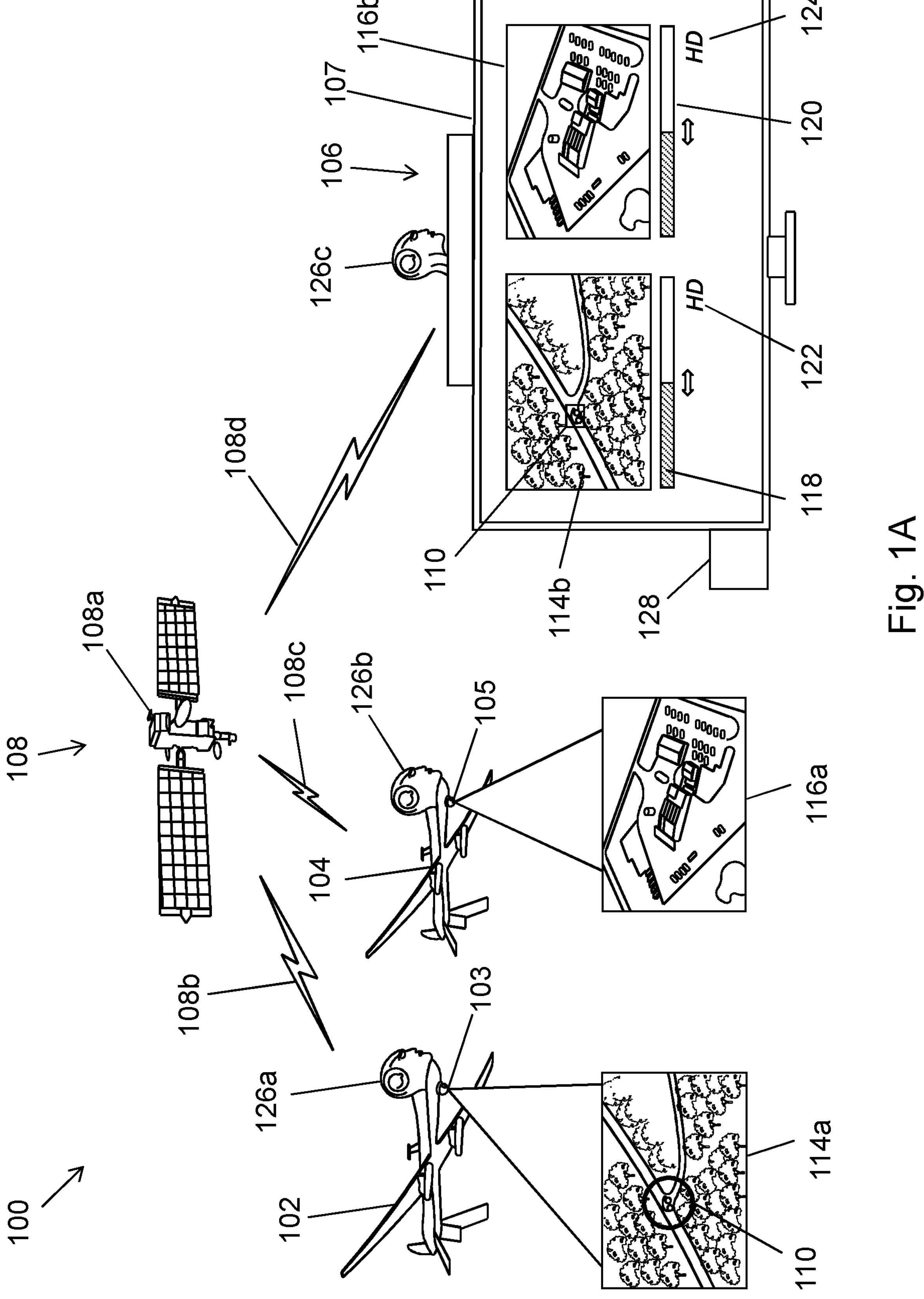
FIG. 1A shows a schematic view of an apparatus according to embodiments of the present disclosure prior to detection of an object of interest.
Figure 1B:
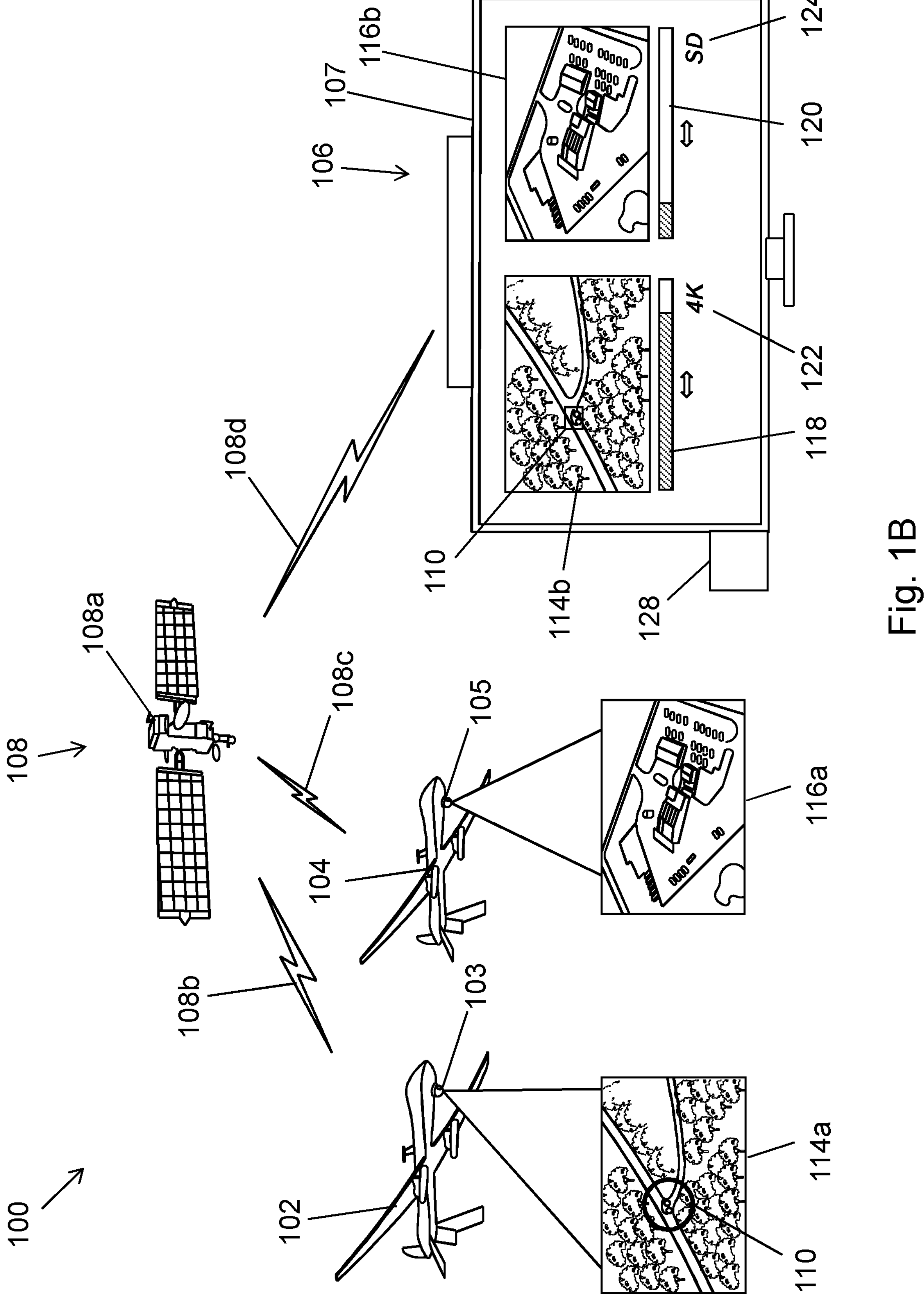
FIG. 1B shows a schematic view of an apparatus according to embodiments of the present disclosure after detection of an object of interest and subsequent bandwidth reallocation.

Referring to FIGS. 1A and 1B, there is shown an apparatus 100 which may form part of an intelligence, surveillance and reconnaissance (ISR) system. The apparatus comprises a first data collector (DC) 102 and a second DC 104, both of which are in communication with a supervising node (SN) 106 over a shared communications resource (SCR) 108. In embodiments, the first DC 102 and the second DC 104 are intelligence data collectors such as unmanned aerial vehicles (UAVs) or drones. The SN 106 is typically situated remotely at a command post where it may be at least partially operated by a human operator. In embodiments, the SCR 108 includes a communications satellite 108*a*. For example, the SCR 108 may comprise an allocation of shared spectrum on a single transponder of the communications satellite 108*a*. In such an embodiment, the SCR 108 therefore includes a number of wireless data transmission paths. Specifically, a first wireless data transmission path 108*b* between the first DC 102 and the satellite 108*a*, a second wireless data transmission path 108*c* between the second DC 104 and the satellite 108*a*, and a third wireless data transmission path 108*d* between the satellite 108*a* and the SN 106. However, alternative bearers for the transmission of data from the DCs to the SN are contemplated, such as terrestrial radio frequency and/or microwave links and the like.

Examples of the functionality of the apparatus 100 will now be described.

Sensor data are transmitted from the first DC 102 and from the second DC 104 to the SN 106 over the SCR 108. The sensor data could be derived from a number of different sensor types or combinations thereof applicable to intelligence gathering operations. In embodiments, the first DC 102 comprises a video capture device 103 (VCD). As such, the sensor data transmitted from the first DC 102 to the SN 106 may comprise first video data. The second DC 104 may also comprise a VCD 105. The VCDs may operate in the visible light domain, or alternatively or in addition also in the infrared, ultraviolet or x-ray domains. It should be appreciated that one or both of the DCs may include additional VCDs capturing complementary video data. For example, additional VCDs may have partially or completely non-overlapping fields of view with other VCDs to provide additional angular spatial coverage at each DC. In some embodiments, the total angular coverage of one of both of the DCs may be 360 degrees. References to sensor data herein may include combined sensor data captured from two or more VCDs on a single DC. Additional sensor types may also be provided on the DCs, such as radar devices, for example.

During operations, the VCD 103 of the first DC 102 would typically, though not necessarily, be trained on a different region to the VCD 105 of the second DC 104. For example, with reference to FIGS. 1A and 1B, the VCD 103 of the first DC 102 captures a scene 114*a* which is distinct from a scene 116*a* captured by the VCD 105 of the second DC 104. This may be because the first DC 102 is travelling to a reconnaissance target site whereas the second DC 104 already has the target site within its field of view, or vice versa. For example, multiple UAVs acting as DCs may be flying between a target site and a base airfield for alternate observation duty and refueling and the like. The SN 106 receives the sensor data via the SCR 108 and reproduces the sensor data for consumption by an operator. For example, the SN 106 may comprise a visual display unit (VDU) 107 which displays a first video feed 114*b* corresponding to the first video data received from the first DC 102 and a second video feed 116*b* corresponding to second video data received from the second DC 104. In embodiments, the VDU 107 of the SN 106 displays further indications as described elsewhere herein.

The apparatus 100 performs computer object detection on sensor data collected by the first DC 102 and the second DC 104. Computer object detection is a computer technology related to computer vision and image processing that deals with detecting instances of semantic objects of a certain class (such as humans, buildings, or cars) in digital imagery and videos. It will be appreciated that computer object detection may be performed not only on imagery and videos captured in the visible light domain, but that it is also applicable to data captured in other regions of the electromagnetic spectrum such as x-ray, ultraviolet and/or infrared imagery. The skilled person would be familiar with implementation details relating to computer object detection and therefore precise implementation details are not provided herein.

With reference to FIG. 1B, responsive to the computer object detection identifying an object of interest (OOI) 110 within the sensor data collected by the first DC 102, the apparatus 100 increases the bandwidth allocated to the first DC 102 on the SCR 108. In embodiments, this is at least partially achieved by reapportioning bandwidth on the SCR 108 from the second DC 104 to the first DC 102. In some embodiments, this is at least partially achieved by allocating bandwidth from the SCR 108 to the first DC 102 that was not previously allocated. In yet further embodiments, this is at least partially achieved by provisioning additional communications resources (i.e., additional to the SCR 108) to the first DC 102. It should be appreciated that the bandwidth allocated to the first DC 102 may be increased by any combination of the above, for example by both reapportioning bandwidth on the SCR 108 from the second DC 104 to the first DC 102 and by allocating bandwidth from the SCR 108 to the first DC 102 that was not previously allocated to either the first DC 102 or to the second DC 104. The resulting effect of any combination of the above is that the first DC 102 subsequently has available to it an increased bandwidth allocation for transmission of further sensor data to the SN 106.

After increasing the bandwidth allocated to the first DC 102, further sensor data are transmitted from the first DC 102 to the SN 106 utilizing the increased bandwidth allocation, i.e., making effective use of the additional bandwidth allocated to it. In embodiments, this comprises transmitting the further sensor data from the first DC 102 to the SN 106 at the highest bit rate of data transmission supported by the increased bandwidth allocation. This is applicable where the sensor data are digitally encoded at the first DC 102 for transmission to the SN 106. However, it should be appreciated that the sensor data may also comprise an analogue signal, whereby utilizing the increased bandwidth allocation may comprise using an increased modulation bandwidth of a carrier signal, for example. It should be appreciated that the sensor data transmitted from the first DC 102 to the SN

106 may comprise a combination of digital and analogue data, whereby utilizing the increased bandwidth allocation would include both increasing a bit rate of transmission and using an increased modulation bandwidth of a carrier signal.

In embodiments, responsive to the computer object detection identifying an OOI 110 within the sensor data collected by the first DC 102, the apparatus 100 reduces the bandwidth allocated to the second DC 104 on the SCR 108. Further sensor data may then be transmitted from the second DC 104 to the SN 106 utilizing the reduced bandwidth allocation. It should be appreciated that it is not always necessary or inevitable to reduce the bandwidth allocated to the second DC 104 in order to increase the bandwidth allocated to the first DC 102. For example, if the first DC 102 and the second DC 104 are initially jointly using less than 100% of the total provisioned bandwidth on the SCR 108, then the first DC 102 can be allocated more bandwidth without necessarily taking any bandwidth allocation away from the second DC 104. In embodiments, utilizing the reduced bandwidth allocation comprises transmitting the further sensor data from the second DC 104 to the SN 106 at the highest bit rate of data transmission supported by the reduced bandwidth allocation. This ensures that the further sensor data received from the second DC 104 at the SN 106 remains of the highest quality possible within the limits of the decreased bandwidth available to the second DC 104.

By way of example, suppose the first DC 102 and the second DC 104 are initially allocated equal shares of an SCR 108 providing a total bandwidth of 12 Mbps. Initially, therefore, the first DC 102 and the second DC 104 may transmit their respective sensor data to the SN 106 at 6 Mbps each (ignoring, for the purpose of example, data overheads such as packet headers and the like). However, following the computer object detection identifying an OOI 110 in the sensor data collected by the first DC 102, the bandwidth allocated to the first DC 102 may be increased to a 75% share of the total bandwidth of 12 Mbps, i.e., it may be increased from 6 Mbps to 9 Mbps. Accordingly, the first DC 102 then increases the rate of further sensor data transmission to substantially or completely utilize this increased allocation, i.e., up to 9 Mbps (again, ignoring overheads). Similarly, the bandwidth allocated to the second DC 104 may be reduced to a 25% share of the total bandwidth of 12 Mbps, i.e., it may be decreased from 6 Mbps to 3 Mbps. Accordingly, the second DC 104 decreases the rate of further sensor data transmission to substantially or completely utilize this reduced allocation, i.e., up to 3 Mbps.

In embodiments where the first DC 102 and the second DC 104 comprise respective VCDs 103, 105, transmitting further sensor data from the first DC 102 to the SN 106 utilizing an increased bandwidth allocation may comprise transmitting video data captured by the VCD 103 of the first DC 102 which has an increased resolution and/or a reduced compression ratio and/or a higher frame rate. Similarly, transmitting further sensor data from the second DC 104 to the SN 106 utilizing a reduced bandwidth allocation may comprise transmitting video data captured by the VCD 105 of the second DC 104 which has a decreased resolution and/or an increased compression ratio and/or a lower frame rate. For example, the VCDs 103, 105 may both be 4K ultra high-definition (UHD) capable video cameras. Initially, prior to detection of an OOI 110, high-definition (HD) video data may be transmitted to the SN 106 from the first DC 102 and from the second DC 104, and reproduced in HD on the VDU 107 of the SN 106. Following detection of an OOI 110 in the video data captured by the first DC 102, the video data stream from the first DC 102 to the SN 106 may be made at the full 4K ultra high-definition (UHD) resolution of the video camera, thereby utilizing the increased bandwidth allocation to the first DC 102. Due to a reduced bandwidth allocated to the second DC 104, it may be necessary to reduce the resolution of the video data stream from the second DC 104 to the SN 106. For example, it may be switched from an HD stream to a standard definition (SD) stream. Similar considerations apply in respect of the video data compression ratio and frame rates. It should be appreciated that a net result of the above is that higher quality video data are provided from the first DC 102 to an operator of the SN 106. This may have the effect of enhancing the ability of an operator to make accurate assessments pertaining to the nature and/or identity of the OOI 110 within the field of view of the first DC 102. In embodiments, video data encoding is not limited to the discrete formats SD, HD and UHD. For example, H.265 encoding allows many combinations of resolution and frame rate, thereby allowing for finer adjustment of the video stream bit rate to closely match the available bandwidth.

In embodiments, the VDU 107 of the SN 106 displays various graphical indications relaying the current status of bandwidth allocation on the SCR 108 to a human operator. In the embodiments illustrated in FIGS. 1A and 1B, the portion of bandwidth allocated to the first DC 102 is represented on a first graphical scale 118 below the first video feed 114*b*, and the portion of bandwidth allocated to the second DC 104 is represented on a second graphical scale 120 below the second video feed 116*b*. In addition, the resolution of the video streams from the first DC 102 and the second DC 104 (e.g., 4K, HD, SD) is displayed in first and second indications 122, 124 adjacent the first and second video feeds 114*b*, 116*b*.

In embodiments, the apparatus 100 allocates bandwidth on the SCR 108 equally between the first DC 102 and the second DC 104 when an OOI 110 is no longer identified within the sensor data collected by the first DC 102. In this manner, the apparatus 100 effectively reverts to a default state whereby bandwidth is shared equally amongst the DCs 102, 104 when no specific OOI 110 is identified by either of the DCs 102, 104. Alternatively, or in addition, the bandwidth may be reallocated equally after a fixed period of time since an OOI 110 was detected, or manually at the request of an operator.

In embodiments, performing computer object detection comprises operating a computer vision system 126*a*, 126*b*, 126*c* initialized with a training set corresponding to OOIs 110. Example OOIs 110 include, but are not limited to, tanks, armored vehicles, aircraft, lorries, cars, humans and the like. In embodiments, other objects which do not form part of the training set are ignored by the computer vision system, i.e., they do not trigger any bandwidth adjustment. In embodiments, each OOI 110 is assigned a corresponding weighting factor which is used to determine a magnitude of the increase in bandwidth allocated to first DC 102 when the first DC 102 has the particular OOI 110 within its sensor field of view. This is because certain OOIs 110 may warrant transmission of higher quality imagery to the SN 106 than other OOIs. For example, a human OOI 110 may be assigned a larger weighting factor than a vehicular OOI 110, in order to assist in recognizing the identity of the human at the SN 106. As such, when one of the DCs 102, 104 recognizes a human, its bandwidth allocation may be increased by a larger amount than if it recognizes a vehicle, for example. The weighting factor of each OOI may be representative of a “level of interest” associated with each OOI.

In embodiments, the computer object detection is performed locally on both the first DC 102 and the second DC 104. For example, the first DC 102 may comprise a computer vision processor 126*a* which is operable to locally process sensor data collected by the first DC 102 in order to perform computer object detection. Likewise, the second DC 104 may comprise a computer vision processor 126*b* which is operable to locally process sensor data collected by the second DC 104 in order to perform computer object detection. It should be appreciated that by processing sensor data locally on the DCs 102, 104, the computer object detection algorithm can be provided with raw data from the sensors, rather than sensor data that may already have been compressed and/or otherwise processed for transmission to the SN 106. This is likely to result in more accurate performance of the computer object detection. Nevertheless, in some embodiments, the computer objection detection is performed on a computer vision processor 126*c* of the SN 106, or on a combination of the DCs 102, 104 and on the SN 106. It may sometimes be desirable to perform computer object detection on the SN 106, for example if the processing capability on the DCs 102, 104 is limited or if newer training sets are currently available only to the SN 106 and not to the DCs 102, 104.

Further aspects of bandwidth allocation according to embodiments of the disclosure are now described with reference to FIGS. 2 to 5. In embodiments, the step of increasing the bandwidth allocated to the first DC 102 is initiated autonomously by transmittal of a command from the first DC 102 to a network management system (NMS) 128. Alternatively, the bandwidth increase may be initiated autonomously by transmittal of a command from the SN 106 to the NMS 128. It should be appreciated that the NMS 128 may be provided as an integral part of the SN 106, for example as an application layer therein, and therefore in some embodiments the NMS 128 is effectively indistinguishable from the SN 106. Alternatively, the NMS 128 may be a separate unit, remote from the SN 106 and the DCs 102, 104, whereby the SN 106 and DCs 102, 104 may transmit commands to the remote NMS 128 over a communications layer. In some embodiments, the NMS may be provided by the provider of the SCR 108, for example at a communication system's operations center linked to one or more communications satellite 108*a* ground stations. By way of example, in operation, NMS 128 commands may be issued to a payload management system which could then in turn reconfigure the payload (for example, satellite transponders).

Figure 2A:
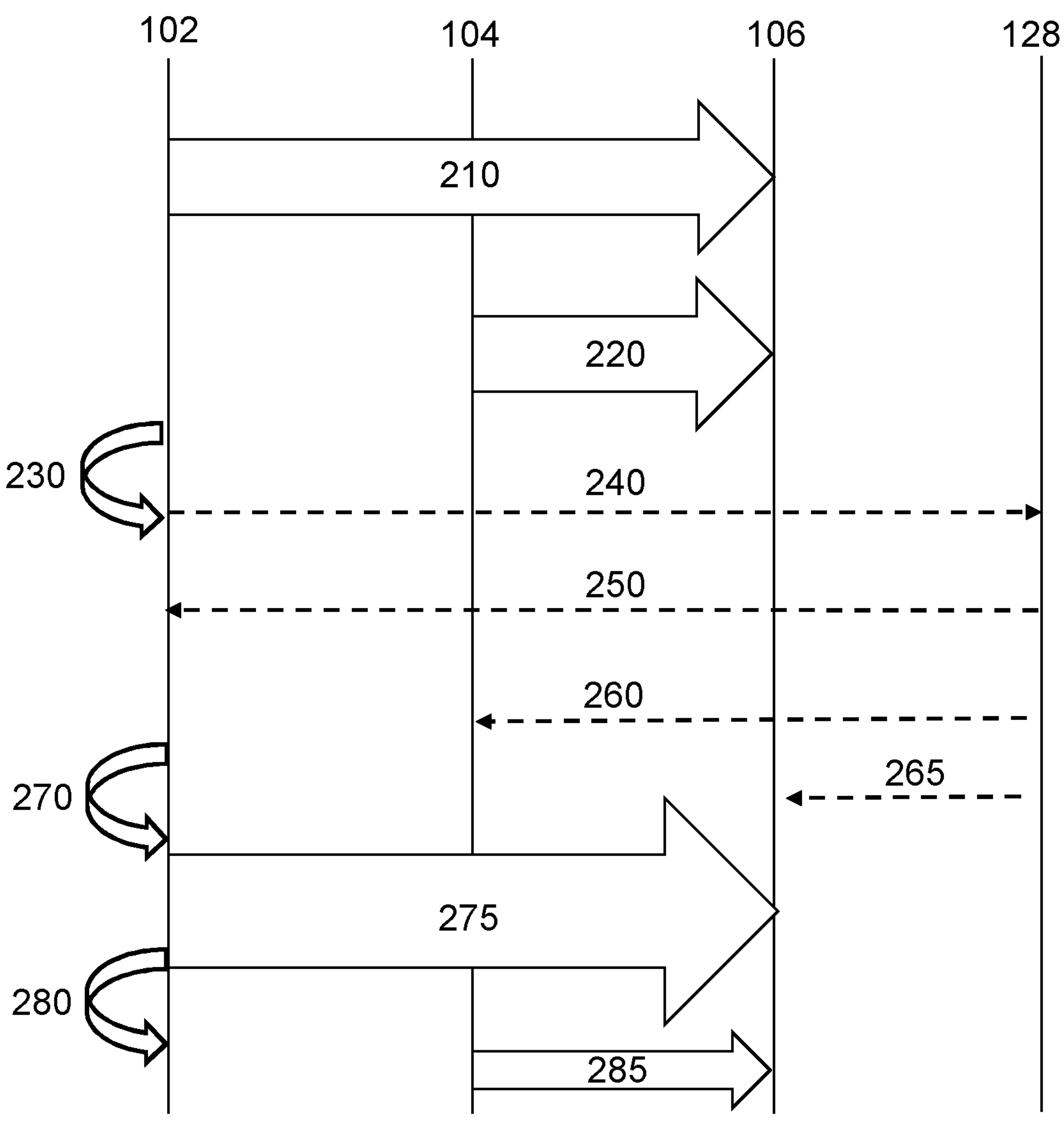
FIGS. 2A-2C and 3 to 5 indicate schematically the allocation of bandwidth to first and second data collectors according to embodiments of the present disclosure.

With reference to FIG. 2A, arrows 210 and 220 represent initial transmission of sensor data from the first and second DCs 102, 104 respectively to the SN 106. The thickness of the arrows schematically indicates the bandwidth of the data transmissions being occupied on the SCR 108. Initially, both DCs 102, 104 are allocated equal amounts of bandwidth, for example supporting simultaneous HD video streams from both the first 102 and second 104 DCs to the SN 106. Subsequently, computer vision system 126*a*, local to the first DC 102, identifies 230 an OOI 110 within the field of view of the VCD 103 of the first DC 102. Consequently, the first DC 102 transmits a request 240 to the NMS 128 to be allocated additional bandwidth. The NMS 128 reconfigures existing resources and/or provisions additional resources in the manner described hereinabove. Subsequently, the NMS 128 transmits a message 250 to the first DC 102 notifying the first DC 102 of its increased bandwidth allocation. In this embodiment, the NMS 128 also transmits a separate message 260 to the second DC 104 notifying the second DC 104 that its bandwidth allocation has been decreased. Consequently, the first DC 102 increases 270 a bit rate of transmission 275 of further sensor data to the SN 106, as represented by the thicker arrow in FIG. 2A, in order to fully utilize the increased bandwidth allocation to the first DC. This may indicate an increased resolution of video data transmission from the first DC 102 to the SN 106, for example a switch from HD to 4K video. The second DC 104 decreases 280 a bit rate of transmission 285 of further sensor data to the SN 106, as represented by the thinner arrow in FIG. 2A. This may indicate a decreased resolution of video data transmission from the second DC 104 to the SN 106, for example a switch from HD to SD video. Optionally, the NMS 128 may transmit a message 265 to the SN 106 to inform the SN 106 of the reconfigured bandwidth allocations. In some embodiments it may not be necessary for the DCs 102, 104 to be explicitly notified of the magnitude of their reconfigured bandwidth allocations, or even that a change of bandwidth has occurred. For example, in embodiments the DCs 102, 104 and/or the SN 106 may periodically probe the amount of bandwidth available to them on the SCR 108 and adjust data transmission bit rates to fully utilize the available bandwidth. This may be done by means of assured messaging, for example.

Figure 2B:
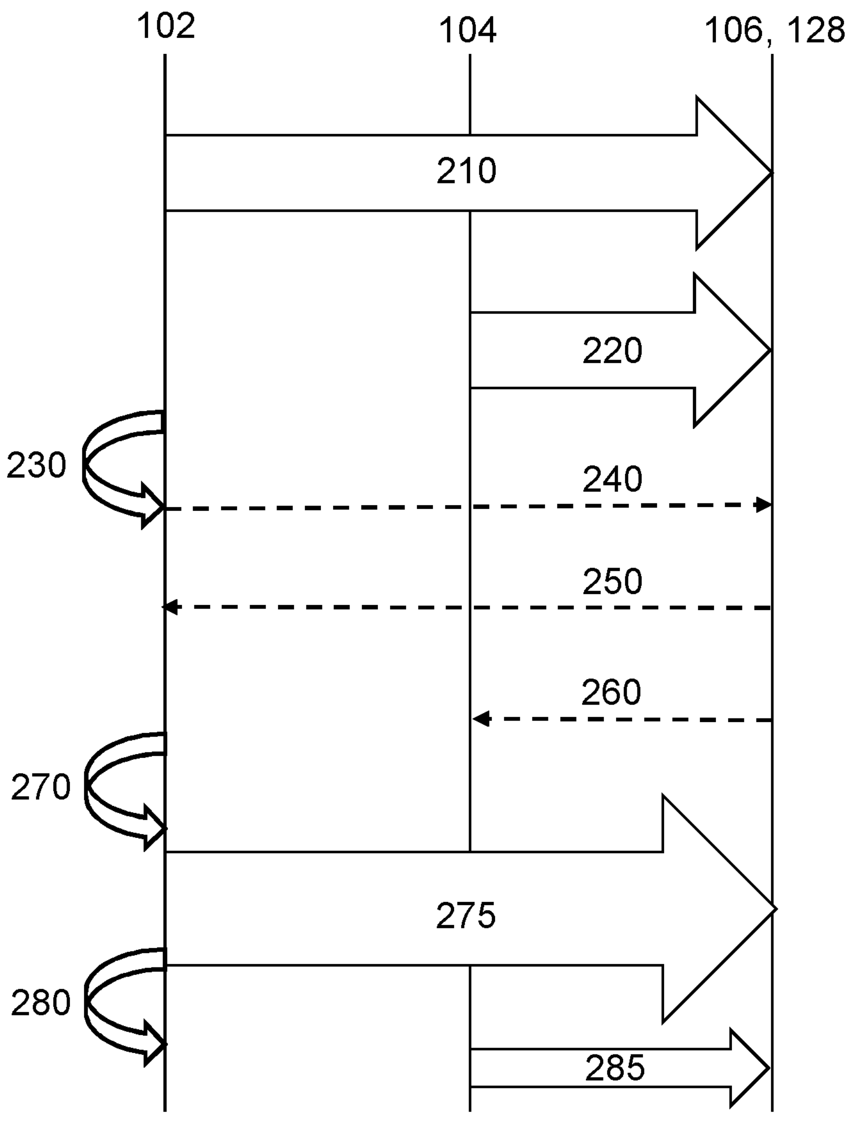

As described above, the NMS 128 may be provided as an integral part of the SN 106, for example as an application layer therein, and therefore in hardware terms is sometimes indistinguishable from the SN 106 itself. This is illustrated schematically in FIG. 2B where the SN 106 and NMS 128 nodes are concatenated together. In all other respects the embodiment of FIG. 2B is the same as FIG. 2A. The same applies to the embodiments described with reference to FIGS. 3 to 5 below.

Figure 2C:
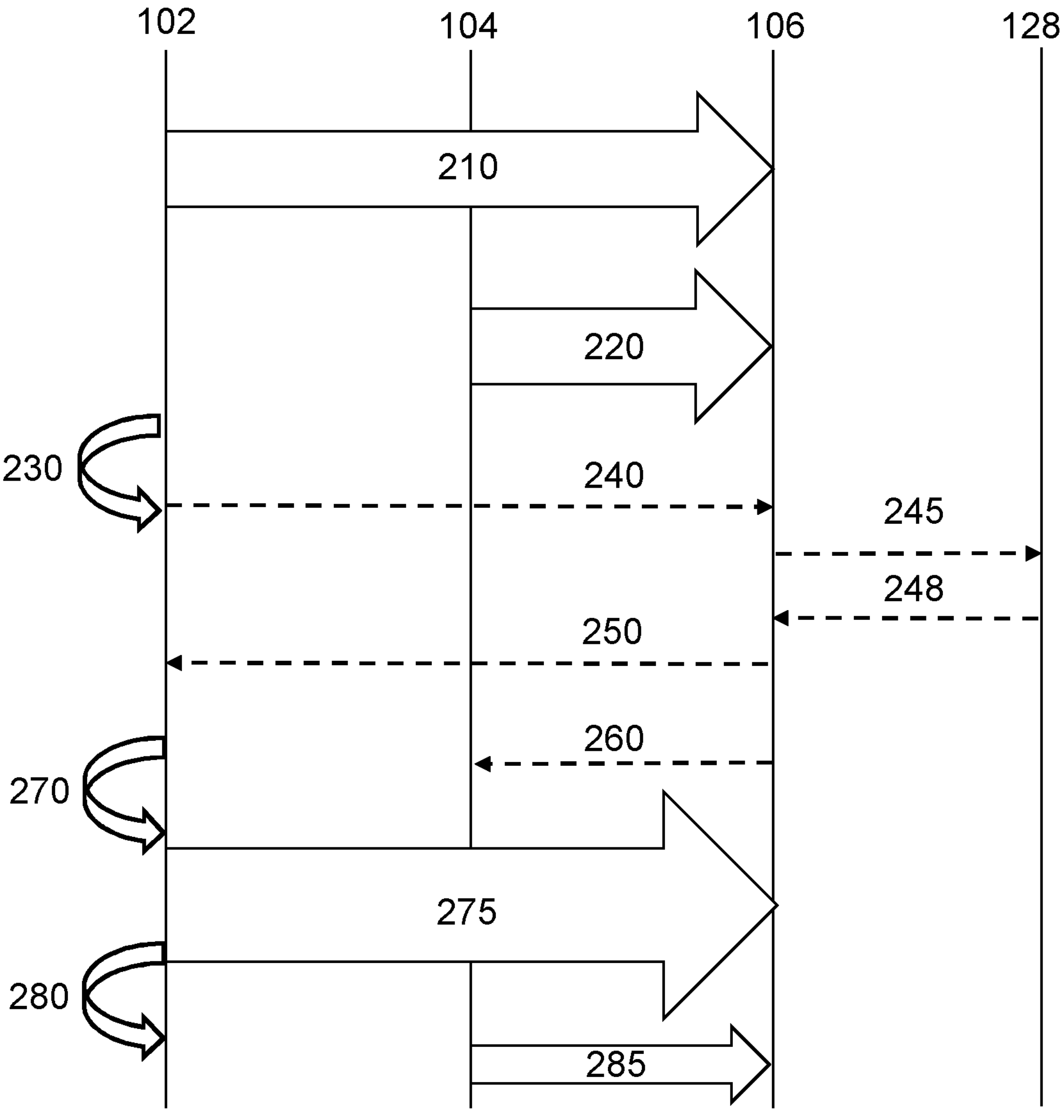

In alternative embodiments, with reference to FIG. 2C, the DCs 102, 104 may communicate directly only with the SN 106, and not directly with the NMS 128, and the NMS 128 may communicate directly only with the SN 106. This may be the case even when the NMS 128 does not form part of the SN 106 itself. In other words, all communications with the NMS 128 pertaining to DC 102, 104 bandwidth allocation may be routed via the SN 106. FIG. 2C is equivalent to FIG. 2A except that all such communications are routed via the SN 106. The first DC 102 transmits a request 240 to the SN 106 to be allocated additional bandwidth. The SN 106 relays this in a request 245 to the NMS 128 which reconfigures existing resources and/or provisions additional resources in the manner described hereinabove. Subsequently, the NMS 128 transmits a message 248 back to the SN 106 and the SN 106 then transmits a message 250 to the first DC 102 notifying the first DC 102 of its increased bandwidth allocation. The SN 106 also transmits a separate message 260 to the second DC 104 notifying the second DC 104 that its bandwidth allocation has been decreased. The same or similar routing of requests and messages via the SN 106 may also be applied mutatis mutandis to the embodiments described with reference to FIGS. 3 to 5 below.

Figure 3:
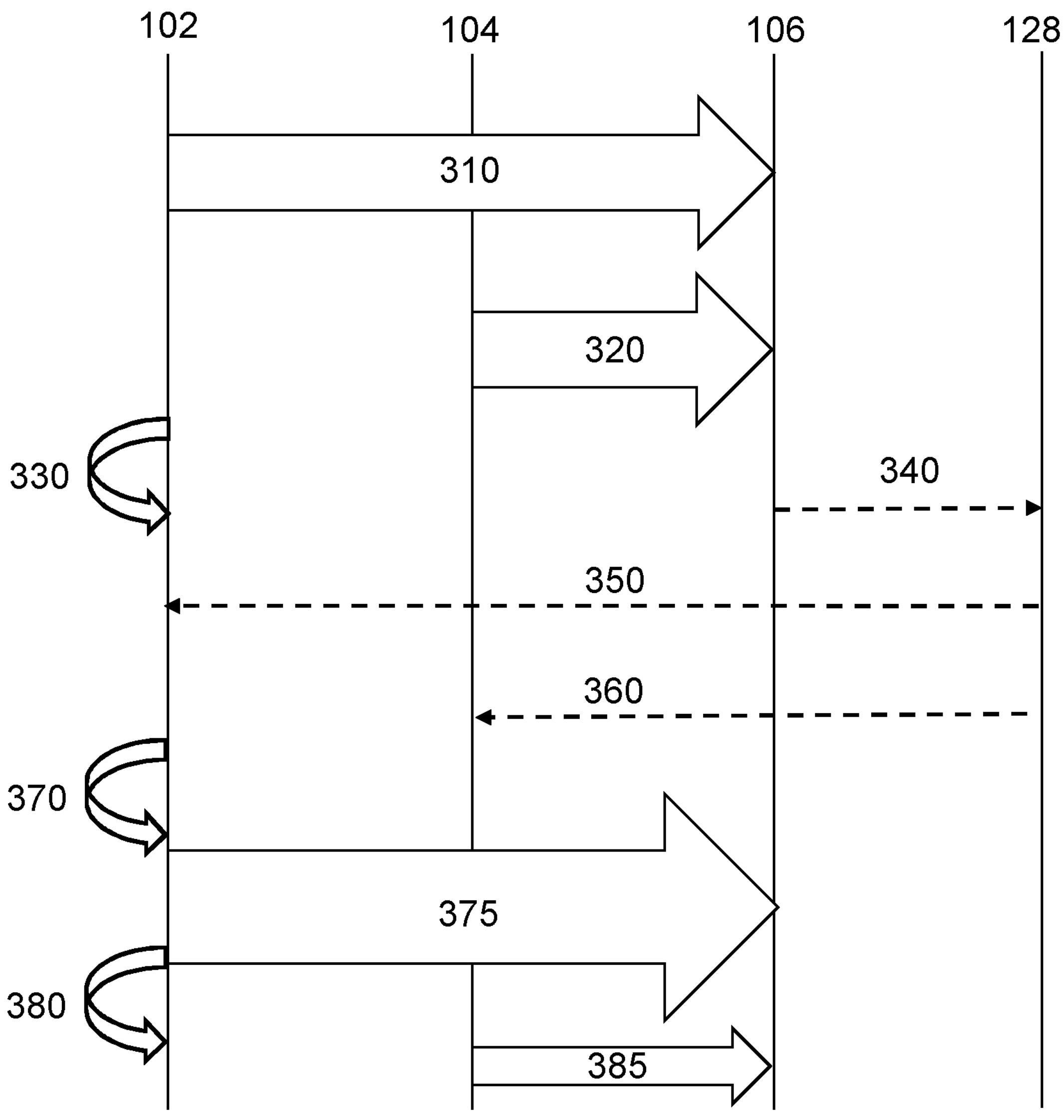

In alternative embodiments, with reference to FIG. 3, arrows 310 and 320 represent initial transmission of sensor data from the first and second DCs 102, 104 respectively to the SN 106. The thickness of the arrows schematically indicates the bandwidth of the transmissions being occupied on the SCR 108. Initially, both DCs 102, 104 are allocated equal amounts of bandwidth, for example supporting simultaneous HD video streams from both the first 102 and second 104 DCs to the SN 106. Subsequently, computer vision system 126*c*, which operates on the SN 106 itself rather than locally on the first DC 102 as described above with reference to FIG. 2A, identifies 330 an OOI 110 within the field of view of the VCD 103 of the first DC 102. Consequently, the SN 106 transmits a request 340 to the NMS 128 to allocate additional bandwidth to the first DC 102. The NMS 128 reconfigures existing resources and/or provisions additional resources in the manner described hereinabove. Subsequently, the NMS 128 transmits a message 350 to the first DC 102 notifying the first DC 102 of its increased bandwidth allocation. In this embodiment, the NMS 128 also transmits a separate message 360 to the second DC 104 notifying the second DC 104 that its bandwidth allocation has been decreased. Consequently, the first DC 102 increases 370 a bit rate of transmission 375 of further sensor data to the SN 106, as represented by the thicker arrow in FIG. 3, in order to fully utilize the increased bandwidth allocation to the first DC. This may indicate an increased resolution of video data transmission from the first DC 102 to the SN 106, for example a switch from HD to 4K video. The second DC 104 decreases 380 a bit rate of transmission 385 of further sensor data to the SN 106, as represented by the thinner arrow in FIG. 3. This may indicate a decreased resolution of video data transmission from the second DC 104 to the SN 106, for example a switch from HD to SD video.

Figure 4:
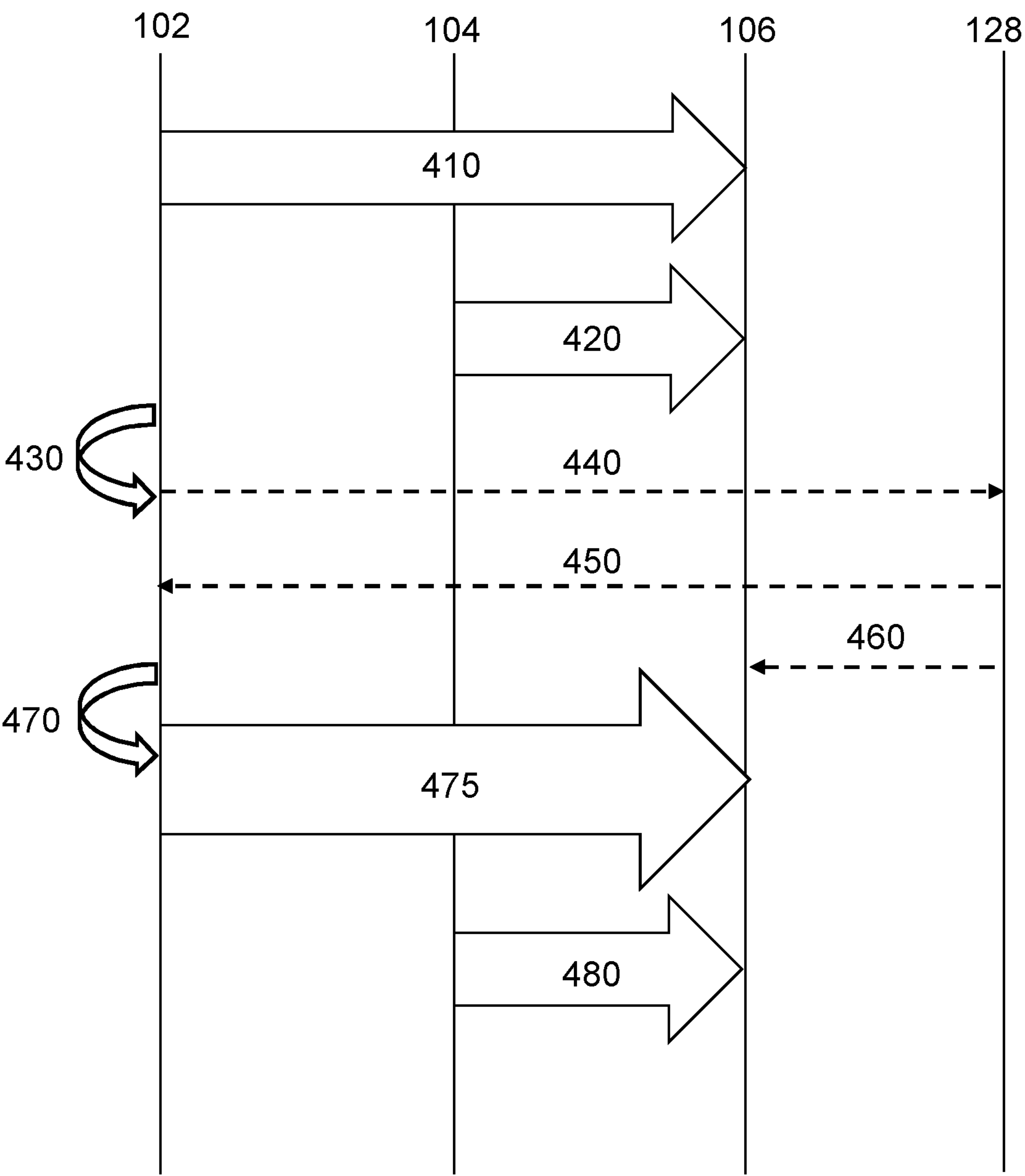

In alternative embodiments, with reference to FIG. 4, arrows 410 and 420 represent initial transmission of sensor data from the first and second DCs 102, 104 respectively to the SN 106. Initially, both DCs 102, 104 are allocated equal amounts of bandwidth, for example supporting simultaneous HD video streams from both the first 102 and second 104 DCs to the SN 106. Subsequently, computer vision system 126*a*, local to the first DC 102, identifies 430 an OOI 110 within the field of view of the VCD 103 of the first DC 102. Consequently, the first DC 102 transmits a request 440 to the NMS 128 to be allocated additional bandwidth. The NMS 128 reconfigures existing resources and/or provisions additional resources in the manner described hereinabove. Subsequently, the NMS 128 transmits a message 450 to the first DC 102 notifying the first DC 102 of its increased bandwidth allocation. In embodiments, the NMS 128 also transmits a message 460 to the SN 106 to inform the SN 106 of the reconfigured bandwidth allocation. It should be appreciated that in these embodiments, the NMS 128 does not need to transmit any messages to the second DC 104 because the NMS has not changed an amount of bandwidth allocated to the second DC 104 and therefore the second DC 104 can continue operating in the same manner as before the request 440 was transmitted from the first DC 102 to the NMS 128. This may be because the NMS has allocated bandwidth from the SCR 108 to the first DC 102 that was not previously allocated and/or because the NMS 128 has provisioned additional communications resources to the first DC 102. Subsequently, the first DC 102 increases 470 a bit rate of transmission 475 of further sensor data to the SN 106, as represented by the thicker arrow in FIG. 4, in order to fully utilize the increased bandwidth allocation to the first DC 102. This may indicate an increased resolution of video data transmission from the first DC 102 to the SN 106, for example a switch from HD to 4K video. The second DC 104 continues transmitting further sensor data 480 at the same bit rate as before. For example, it continues transmitting an HD video stream to the SN 106.

In alternative embodiments, the increase in bandwidth is initiated more manually than in the embodiment described above. For example, an operator of the SN 106 may be alerted when an OOI 110 is identified. The alert could be delivered in one or more of several different manners. For example, an audible alert, a visual alert, a text or instant message, or an email. The operator may then select a function on the SN 106 in order to cause the bandwidth allocation to the relevant DC 102, 104 to be increased, by instigating the issuance of a command to the NMS 128. The operator may also manually override a pre-selected magnitude of bandwidth increase if they desire. Indeed, the operator could choose to divert all of the available bandwidth on the SCR 108 to just one of the DCs 102, 104 thereby sacrificing one of the feeds into the SCR in order to obtain the highest fidelity data from the DC 102, 104 identifying the OOI 110.

Figure 5:
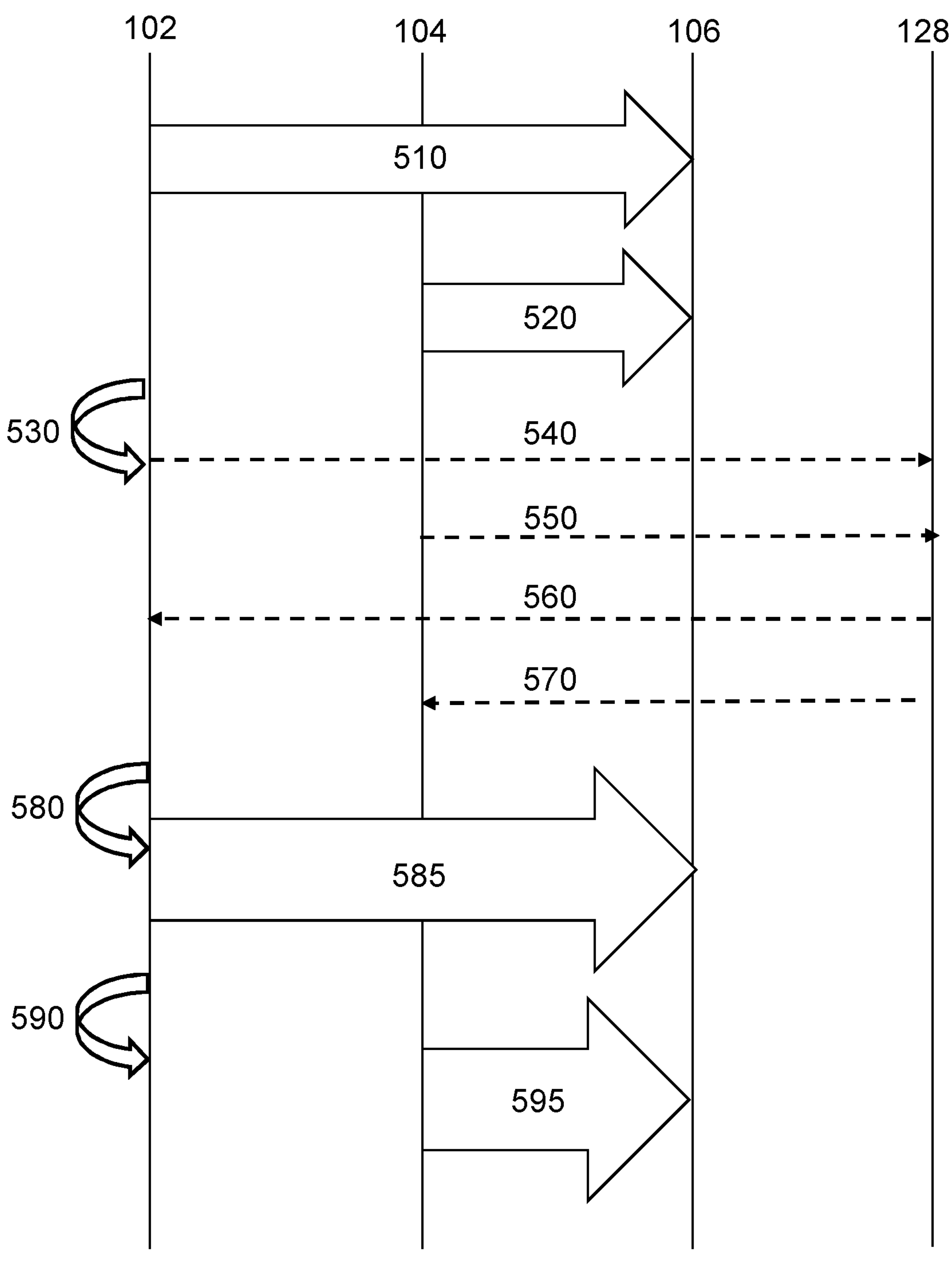

With reference to FIG. 5, in some embodiments, responsive to the computer object detection identifying OOIs 110 within the sensor data collected by both the first and second DCs 102, 104, the bandwidth allocated to both the first and second DCs 102, 104 is increased. For example, computer vision systems 126*a* and 126*b* local to the first and second DCs 102, 104 respectively may identify OOIs substantially simultaneously. Arrows 510 and 520 represent initial transmission of sensor data from the first and second DCs 102, 104 respectively to the SN 106. Initially, both DCs 102, 104 are allocated equal amounts of bandwidth, for example supporting simultaneous HD video streams from both the first 102 and second 104 DCs to the SN 106. Subsequently, computer vision systems 126*a* and 126*b*, local to the DCs, both identify 530 OOIs 110. Consequently, the first DC 102 transmits a request 540 to the NMS 128 to be allocated additional bandwidth and the second DC 104 also transmits a request 550 to the NMS 128 to be allocated additional bandwidth. In response to this, the NMS 128 reconfigures existing resources and/or provisions additional resources in the manner described hereinabove. Subsequently, the NMS 128 transmits a message 560 to the first DC 102 notifying the first DC 102 of its increased bandwidth allocation and also transmits a message 570 to the second DC 104 notifying the second DC 104 of its increased bandwidth allocation. Consequently, both the first DC 102 and second DC 104 increase 580, 590 a bit rate of transmission 585, 595 of further sensor data to the SN 106, as represented by the thicker arrows in FIG. 5, in order to fully utilize the increased bandwidth allocation to the first and second DCs 102, 104. This may indicate an increased resolution of video data transmission from the first and second DCs 102, 104 to the SN 106, for example a switch from HD to 4K video.

It should be appreciated that while the foregoing embodiments are described in the context of two DCs 102, 104, the present disclosure also extends to apparatuses comprising more than two DCs 102, 104, e.g., three or four separate DCs. The skilled person would be able to make the relevant adjustments, in view of the present disclosure, to apply the concepts disclosed herein to a system comprising three or more DCs.

The first DC 102, second DC 104, SN 106 and NMS 128 as described above may each be comprised in or implemented in apparatus comprising a processor or processing system. The processing system may comprise one or more processors and/or memory. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms “comprise” or “comprising” do not exclude other elements or steps, the terms “a” or “one” do not exclude a plural number, and the term “or” means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method of allocating bandwidth in a system comprising first and second data collectors in communication with a supervising node over a shared communications resource, the method comprising:

transmitting sensor data from the first and second data collectors to the supervising node over the shared communications resource, wherein the first data collector comprises a first un-manned aerial vehicle and the second data collector comprises a second un-manned aerial vehicle;

performing computer object detection on sensor data collected by the first and second data collectors, wherein performing the computer object detection comprises operating a computer vision system initialized with a training set corresponding to objects of interest;

responsive to the computer object detection identifying an object of interest within the sensor data collected by the first data collector, increasing the bandwidth allocated to the first data collector on the shared communications resource; and transmitting further sensor data from the first data collector to the supervising node utilizing the increased bandwidth allocation, wherein performing the computer object detection on sensor data collected by the first and second data collectors comprises performing computer object detection locally on the first and second data collectors respectively.

2. The method of claim 1, wherein increasing the bandwidth allocated to the first data collector comprises reapportioning bandwidth on the shared communications resource from the second data collector to the first data collector.

3. The method of claim 1, wherein increasing the bandwidth allocated to the first data collector comprises allocating bandwidth from the shared communications resource to the first data collector that was not previously allocated.

4. The method of claim 1, wherein increasing the bandwidth allocated to the first data collector comprises provisioning additional communications resources to the first data collector, wherein the increased bandwidth allocation comprises the additional communications resources.

5. The method of claim 1, wherein utilizing the increased bandwidth allocation comprises transmitting the further sensor data from the first data collector to the supervising node at a highest bit rate of data transmission supported by the increased bandwidth allocation.

6. The method of claim 1, further comprising:

responsive to identifying an object of interest within the sensor data collected by the first data collector, reducing the bandwidth allocated to the second data collector on the shared communications resource; and transmitting further sensor data from the second data collector to the supervising node utilizing the reduced bandwidth allocation, wherein utilizing the reduced bandwidth allocation comprises transmitting the further sensor data from the second data collector to the supervising node at a highest bit rate of data transmission supported by the reduced bandwidth allocation.

7. The method of claim 1, further comprising:

prior to the step of performing computer object detection, allocating bandwidth on the shared communications resource equally between the first and second data collectors; and allocating bandwidth on the shared communications resource equally between the first and second data collectors when an object of interest is no longer identified within the sensor data collected by the first data collector.

8. The method of claim 1, wherein performing the computer object detection on sensor data collected by the first and second data collectors comprises performing computer object detection on the supervising node.

9. The method of claim 1, wherein the first data collector comprises a video capture device and the step of transmitting further sensor data from the first data collector to the supervising node utilizing the increased bandwidth allocation comprises transmitting video data captured by the video capture device, the transmitted video data comprising one or more of: an increased resolution, a reduced compression ratio and a higher frame rate.

10. The method of claim 1, wherein each object of interest is assigned a corresponding weighting factor which is used to determine a magnitude of the increase in bandwidth allocated to the first data collector.

11. The method of claim 1, wherein the step of increasing the bandwidth allocated to the first data collector is initiated autonomously by transmittal of a command from the first data collector to a network management system.

12. The method of claim 1, wherein the step of increasing the bandwidth allocated to the first data collector is initiated autonomously by transmittal of a command from the supervising node to a network management system.

13. The method of claim 1, further comprising alerting an operator of the supervising node when an object of interest is identified within the sensor data collected by the first data collector, and wherein increasing the bandwidth allocated to the first data collector is initiated manually by the operator causing issuance of a command to a network management system.

14. The method of claim 13, wherein alerting an operator of the supervising node when an object of interest is identified within the sensor data collected by the first data collector comprises causing one or more of: an audible alert, a visual alert, and an SMS message.

15. The method of claim 1, further comprising:

responsive to the computer object detection identifying objects of interest within the sensor data collected by both the first and second data collectors, increasing the bandwidth allocated to both the first and second data collectors; and transmitting further sensor data from both the first and second data collectors to the supervising node utilizing the increased bandwidth allocation.

16. The method of claim 15, wherein increasing the bandwidth allocated to both the first and second data collectors comprises allocating bandwidth from the shared communications resource to the first and second data collectors that was not previously allocated.

17. The method of claim 15, wherein increasing the bandwidth allocated to both the first and second data collectors comprises provisioning additional communications resources to the first and second data collectors, wherein the increased bandwidth allocation comprises the additional communications resources.

18. An apparatus comprising first and second data collectors in communication with a supervising node over a shared communications resource, the apparatus being configured to:

transmit sensor data from the first and second data collectors to the supervising node over the shared communications resource, wherein the first data collector comprises a first un-manned aerial vehicle and the second data collector comprises a second un-manned aerial vehicle;

perform computer object detection on sensor data collected by the first and second data collectors, wherein performing the computer object detection comprises operating a computer vision system initialized with a training set corresponding to objects of interest;

responsive to the computer object detection identifying an object of interest within the sensor data collected by the first data collector, increase the bandwidth allocated to the first data collector on the shared communications resource; and transmit further sensor data from the first data collector to the supervising node utilizing the increased bandwidth allocation, wherein performing the computer object detection on sensor data collected by the first and second data collectors comprises performing computer object detection locally on the first and second data collectors respectively.

19. A non-transitory computer readable medium storing a computer program comprising a set of instructions, which, when executed by a computerized apparatus, cause the computerized apparatus to perform a method of allocating bandwidth, the method comprising:

transmitting sensor data from the first and second data collectors to the supervising node over a shared communications resource, wherein the first data collector comprises a first un-manned aerial vehicle and the second data collector comprises a second un-manned aerial vehicle;

performing computer object detection on sensor data collected by first and second data collectors, wherein performing the computer object detection comprises operating a computer vision system initialized with a training set corresponding to objects of interest;

responsive to the computer object detection identifying an object of interest within the sensor data collected by the first data collector, increasing the bandwidth allocated to the first data collector on the shared communications resource; and transmitting further sensor data from the first data collector to a supervising node utilizing the increased bandwidth allocation, wherein performing the computer object detection on sensor data collected by the first and second data collectors comprises performing computer object detection locally on the first and second data collectors respectively.

* * * * *